United States Patent
An (10) Patent No.: US 7,227,823 B2
(45) Date of Patent: Jun. 5, 2007

(54) APPARATUS AND METHOD FOR DECIDING OPTIMUM RECORDING POWER IN A DISC DRIVE

(75) Inventor: Jong-tae An, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 615 days.

(21) Appl. No.: 10/657,072

(22) Filed: Sep. 9, 2003

(65) Prior Publication Data
US 2004/0047256 A1    Mar. 11, 2004

(30) Foreign Application Priority Data
Sep. 9, 2002    (KR) ............... 10-2002-0054326

(51) Int. Cl.
G11B 7/00    (2006.01)
(52) U.S. Cl. .................... 369/47.53; 369/116
(58) Field of Classification Search ............ 369/275.3, 369/47.1, 47.5, 47.51, 47.52, 47.53, 116
See application file for complete search history.

(56) References Cited

U.S. PATENT DOCUMENTS

| | | | |
|---|---|---|---|
| 5,341,360 A * | 8/1994 | Johann et al. | 369/47.53 |
| 6,885,617 B2 * | 4/2005 | Fukumoto | 369/47.53 |
| 7,009,924 B2 * | 3/2006 | Morishima | 369/47.53 |
| 7,050,367 B1 * | 5/2006 | Negishi et al. | 369/47.1 |
| 7,085,210 B2 * | 8/2006 | Ogawa | 369/47.53 |

FOREIGN PATENT DOCUMENTS

| | | |
|---|---|---|
| JP | 8-96396 | 4/1996 |
| KR | 2000-0020508 | 4/2000 |

OTHER PUBLICATIONS

Notice of Office Action issued by the Korean Patent Office on Dec. 16, 2004 and English translation thereof.

* cited by examiner

Primary Examiner—Nabil Hindi
(74) Attorney, Agent, or Firm—Staas & Halsey LLP (57) ABSTRACT

An apparatus and method determining an optimum recording power suitable for a disc loaded in a disc drive. The apparatus includes a pickup unit and a control unit. The pickup unit records data in a predetermined area on the disc and reproduces the recorded data from the disc. The control unit controls the disc drive to record data in the predetermined area of the disc using a preset reference recording power. The control unit detects a plurality of recording powers using reproduction signals of the predetermined area reproduced from the pickup unit and one or more reference values, and decides an optimum recording power for the disc based on the detected plurality of recording powers. Thus, the recording power used by an active layer of the disc can be prevented from varying due to hardware error in the disc drive with respect to various kinds of discs.

33 Claims, 2 Drawing Sheets

FIG. 1

APPARATUS AND METHOD FOR DECIDING OPTIMUM RECORDING POWER IN A DISC DRIVE

CROSS-REFERENCE TO RELATED APPLICATIONS

This application claims the benefit of Korean Patent Application No. 2002-54326 filed on Sep. 9, 2002, in the Korean Intellectual Property Office, the disclosure of which is incorporated herein by reference.

BACKGROUND OF THE INVENTION

1. Field of the Invention

The present invention relates to an apparatus and method for determining an optimum recording power in a disc drive, and more particularly, to an apparatus and method for deciding an optimum recording power suitable for a disc inserted in a disc drive.

2. Description of the Related Art

As there are many kinds of recordable discs, a variety of techniques for generating a recording pulse having an optimum recording power have been proposed because the recording power is closely connected with a recording quality and a reproduction quality of the discs.

However, the optimum recording power for discs is different depending on the features of the disc and the performance of the disc drive. Thus, whenever a new disc is loaded in the disc drive, an optimum recording power for the new disc must be determined in order to generate an optimum recording pulse.

In a conventional disc drive, a reference recording power that is prerecorded on a specific area of a disc is referenced as the optimum recording power, and values needed for generating a recording pulse, for example, an optimum erasing power Pe and a bias power Pb are determined corresponding to this reference recording power.

However, an effective recording power, used by an active layer of the disc may vary due to hardware error in the disc drives. Examples of the hardware error include a tilt, a servo remaining error, and a shift of an objective lens.

SUMMARY OF THE INVENTION

The present invention provides an apparatus and method for determining an optimum recording power for various kinds of discs based on a reference recording power information set in a disc drive.

The present invention also provides an apparatus and method for determining an optimum recording power for a disc without considering a reference recording power information recorded in a specific area of the disc.

The present invention further provides an apparatus and method for determining an optimum recording power for a disc, capable of minimizing variation of a recording power used by an active layer of the disc.

According to an aspect of the present invention, there is provided an apparatus for determining an optimum recording power for a disc loaded in a disc drive comprising a pickup unit for recording data on the disc and reproducing the recorded data from the disc, and a control unit which controls the disc drive to record data in a predetermined area of the disc using a reference recording power which is preset, detects a plurality of recording powers using reproduction signals of the predetermined area reproduced from the pickup unit and one or more reference values, and decides an optimum recording power for the disc based on the detected plurality of recording powers.

According to one aspect of the present invention, when the data is recorded in the predetermined area of the disc, the control unit varies the reference recording power. The control unit decides the recording powers used when the data is recorded in the predetermined area, based on the reference recording power, a predetermined variable range of the reference recording power, and a coefficient ($\epsilon$) recorded in a recording information supplying area of the disc.

According to one aspect of the present invention, one or more reference values are set in consideration of any one of a modulation rate and asymmetry between the reproduction signals from the pickup unit, or both the modulation rate and the asymmetry.

According to one aspect of the present invention, in a case where the reference value is set in consideration of the modulation rate between the reproduction signals from the pickup unit, the control unit detects a reproduction signal having the modulation rate closest to the reference value, and detects a recording power used when the detected reproduction signal is recorded as one of the plurality of recording powers. The modulation rate is a modulation rate between the amplitudes of reproduction signals of a minimum mark and a maximum mark recorded in the predetermined area among the reproduction signals from the pickup unit. The reference values corresponding to the modulation rate are variably set depending on the kind of disc.

According to an aspect of the present invention, in a case where the reference value is set in consideration of the asymmetry between the reproduction signals from the pickup unit, the control unit detects a reproduction signal having an asymmetry closest to the reference value, and detects a recording power used when the detected reproduction signal is recorded as one of the plurality of recording powers. The asymmetry is used in detecting whether the reproduction signals of the minimum mark and the maximum mark recorded in the predetermined area among the reproduction signals from the pickup unit are asymmetric about each other. The control unit can use an average value of the detected plurality of recording powers as the optimum recording power.

According to one aspect of the present invention, the apparatus determining the optimum recording power further includes a tilt compensation unit controlled by the control unit and driving the pickup unit to compensate a tilt with respect to the predetermined area of the disc. The control unit determines a compensation amount for the tilt, in which an amount of the jitter is at a minimum, based on the reproduction signal outputted from the pickup unit. The control unit controls the tilt compensation unit while the amount of compensation for the tilt based on an amount of the tilt detected in the pickup unit varies within a predetermined angle range. The control unit determines that the detected compensation amount for the tilt is an optimum compensation amount for the tilt.

According to an aspect of the present invention, the apparatus determining the optimum recording power further includes a decoder decoding a signal outputted from the pickup unit. The control unit checks if a predetermined signal among signals outputted from the decoder satisfies the reference value, and detects a recording power used when the predetermined signal is recorded as one of the plurality of recording powers.

According to an aspect of the present invention, in a case where the reference value is set in consideration of a block error rate, the control unit detects information of block error rates of the signals outputted from the decoder, detects a block where a block error rate is at a minimum, and detects a recording power used when data is recorded on the detected block as one of the plurality of recording powers. Random data is recorded in the predetermined area and the predetermined area is included in a lead-in area of the disc or adjacent to the lead-in area.

According to another aspect of the present invention, a method is provided for determining an optimum recording power for a disc loaded in a disc drive. The method comprises recording data in a predetermined area of the disc using a preset reference recording power, detecting a plurality of reproduction signals among signals reproduced from the predetermined area on the disc based on one or more reference values, and detecting a plurality of recording powers corresponding to the detected plurality of reproduction signals, and determining an optimum recording power for the disc using one of the detected plurality of recording powers.

Additional objects and advantages of the invention will be set forth in part in the description which follows and, in part, will be obvious from the description, or may be learned by practice of the invention.

BRIEF DESCRIPTION OF THE DRAWINGS

These features, and/or other aspects and advantages of the invention will become apparent and more readily appreciated from the following description of the preferred embodiments taken in conjunction with the accompanying drawings in which.

DETAILED DESCRIPTION OF THE INVENTION

Reference will now be made in detail to the preferred embodiments of the present invention, examples of which are illustrated in the accompanying drawings, wherein like reference numerals refer to the like elements throughout. The embodiments are described below in order to explain the present invention by referring to the figures.

Figure 1:
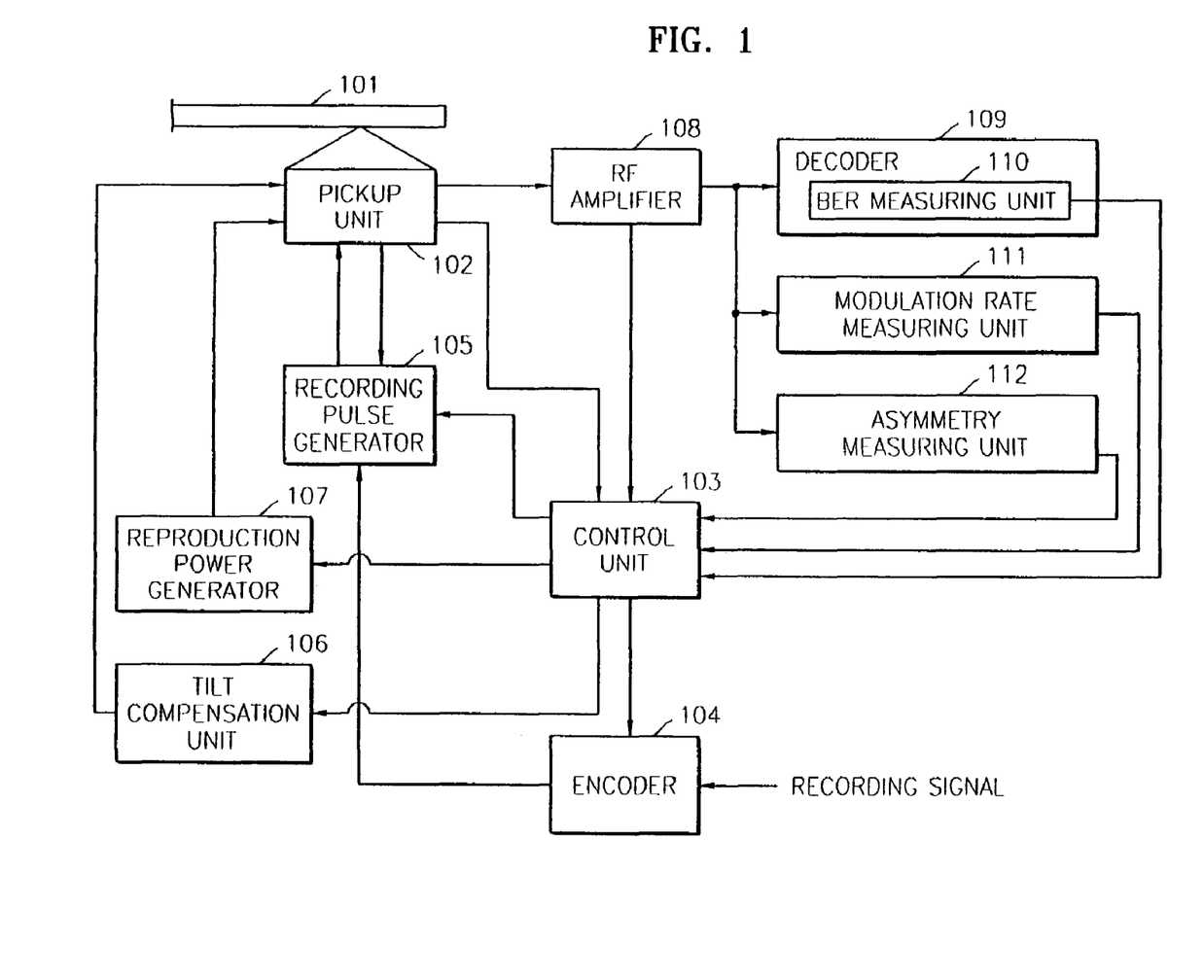
FIG. 1 is a block diagram of a disc drive having an apparatus for determining an optimum recording power according to an aspect of the present invention.

Referring to FIG. 1, a disc drive having an apparatus determining an optimum recording power includes a disc 101, a pickup unit 102, a control unit 103, an encoder 104, a recording pulse generator 105, a tilt compensation unit 106, a reproduction power generator 107, a radio frequency (RF) amplifier 108, a decoder 109, a block error rate (BER) measuring unit 110 in the decoder 109, a modulation rate measuring unit 111, and an asymmetry measuring unit 112.

The disc 101 is a recordable disc, for example, a compact disc-recordable/rewritable (CD-R/RW), a digital versatile disk-R/RW (DVD-R/RW), or a DVD-random access memory (DVD-RAM).

The pickup unit 102 records data on the disc 101 and picks up the data recorded on the disc 101. To perform the above job, the pickup unit 102 includes a laser diode (not shown) for irradiating a light beam on the disc 101 and a driving unit (not shown) for driving the laser diode according to a recording pulse generated from the recording pulse generator 105.

The pickup unit 102 further includes a detecting unit (not shown) for detecting a tilt of the disc 101 and supplying the detected tilt to the control unit 103 such that the control unit 103 controls a tilt compensation for the disc 101. The detecting unit may be located outside the pickup unit 102. The pickup unit 102 is constructed such that the tilt compensation unit 106 can compensate for the tilt of the disc 101.

The control unit 103 is constructed to decide an optimum recording power in accordance with the present invention.

To perform the above job, the control unit 103 controls the encoder 104 and the recording pulse generator 105 so as to record random data in a predetermined area of the disc 101. Recording power needed for generating the recording pulse are decided based on a coefficient $\epsilon$ recorded in a recording information supplying area of the disc 101, a reference recording power Po' which is preset in the control unit 103, and a predetermined variable range a of the reference recording power Po'.

When the random data is recorded in the predetermined area of the disc 101, the control unit 103 decides the optimum recording power based on the reference recording power Po'. The control unit 103 decides an optimum erasing power Pe based on the following equation 1.

$$Pe = (Po' \pm \alpha) \times \epsilon \qquad (1)$$

When random data is recorded in the predetermined area of the disc 101, the control unit 103 varies the reference recording power Po' within the predetermined variable range α. Thus, the optimum erasing power Pe is also varied. The predetermined variable range α may be set at ±30%.

The control unit 103 manages the information for the optimum recording powers to refer to an optimum recording power based on the recording positions of the random data recorded on the disc 101. The optimum recording power has a value obtained by changing the reference recording power Po' within the predetermined variable range α. The predetermined area of the disc 101 may be a specific area included in a lead-in area of the disc 101 or an area adjacent to the lead-in area such as a power control area (PCA).

When the task of recording the random data in the predetermined area of the disc 101 is completed, the control unit 103 detects a compensation amount for a tilt with respect to the predetermined area supplied from the pickup unit 102.

When the compensation amount for the tilt is detected, the control unit 103 controls the tilt compensation unit 106 while the compensation amount for the tilt varies within a predetermined angle range. At this time, the control unit 103 controls the reproduction power generator 107 so as to reproduce the random data recorded in the predetermined area of the disc 101. The predetermined angle range may be set at ±0.4 degree.

The control unit 103 detects a jitter best point, where an amount of jitter is at a minimum, based on an RF signal outputted from the RF amplifier 108. The amount of the jitter is continuously detected while compensating for the tilt within the predetermined angle range. A compensation amount for the tilt used at a position where a minimum amount of the jitter among the amount of the jitter detected is determined as an optimum compensation amount for the tilt. If the optimum compensation amount for the tilt is determined, the control unit 103 supplies the optimum compensation amount for the tilt to the tilt compensation unit 106.

When the tilt compensation is completed, the control unit 103 detects a plurality of recording powers based on measurement results with respect to the predetermined area sent by the BER measuring unit 110 included in the decoder 109, the modulation rate measuring unit 111, and the asymmetry measuring unit 112.

Specifically, an optimum recording power used when data is recorded on a block, where a block error rate (BER) among block error rates of the data recorded in the predetermined area based on the measurement result sent from the BER measuring unit 110 is at a minimum, is detected as a first recording power A.

An optimum recording power used when data is recorded on a block, where a modulation rate between amplitudes of radio frequency signals of a minimum recording mark and a maximum recording mark is closest to a preset reference value based on the measurement result sent from the modulation rate measuring unit 111, is detected as a second recording power B. The preset reference value is set depending on the kind of disc inserted in the disc drive. This reason is that the minimum and maximum recording marks may vary according to the kind of disc.

An optimum recording power used in a block, where the asymmetry between the amplitudes of the radio frequency signals of the minimum recording mark and the maximum recording mark is substantially zero based on the measurement result sent from the asymmetry measuring unit 112, is detected as a third recording power C. Further, the optimum recording powers A, B, and C are detected, and used in determining the optimum recording powers managed by the control unit 103, based on the recording positions of the random data.

When the control unit 103 detects the first to third recording powers A, B, and C, respectively, the control unit 103 calculates an average value of the recording powers A, B, and C using the following equation 2. The average value is determined as an optimum recording power Po of the disc 101 loaded in the disc drive.

$$Po=(A+B+C)/3 \qquad (2)$$

The control unit 103 determines values needed for generating a recording pulse based on the optimum recording power decided as described above. For example, an optimum erasing power Pe is obtained by the following equation 3.

$$Pe=Po \times \epsilon \qquad (3)$$

The encoder 104 and the recording pulse generator 105 operate in recording the data on the disc 101. That is, the encoder 104 encodes an inputted recording signal into a recordable type signal, and sends to the recording pulse generator 105. The recording pulse generator 105 generates a recording pulse needed for recording the data sent from the encoder 104 on the disc 101, based on parameters needed for generating the recording pulse, for example, the optimum recording power, the optimum erasing power, and an optimum bias power, which the control unit 103 supplies. The generated recording pulse is sent to the laser diode driving unit of the pickup unit 102. The random data is supplied to the recording pulse generator 105 through the encoder 104. The data supplied to the recording pulse generator 105 from the encoder 104 is data having a Non-Return to Zero Inverter (NRZI) format.

The tilt compensation unit 106 drives the pickup unit 102 compensating the tilt of the predetermined area of the disc 101 according to a compensation amount for the tilt supplied from the control unit 103. For example, in a case where the tilt is compensated by driving an actuator included in the pickup unit 102, the tilt compensation unit 106 drives the actuator, and the tilt compensation unit 106 includes a driving unit for driving the actuator.

The reproduction power generator 107 generates a reproduction power needed for reproducing the data recorded on the disc 101. The RF amplifier 108 amplifies the RF signal sent from the pickup unit 102 to a predetermined value and outputs the signal.

The decoder 109 decodes the RF signal sent from the RF amplifier 108 into a reproducible signal. The BER measuring unit 110 measures an error rate in units of blocks based on the RF signal of the data recorded in the predetermined area of the disc 101 inputted to the decoder 109. The BER measuring unit 110 supplies the error rate measured in units of blocks to the control unit 103.

The modulation rate measuring unit 111 detects amplitudes of RF signals of a minimum mark and a maximum mark of the random data recorded in the predetermined area of the disc 101 in units of blocks based on the RF signals sent from the RF amplifier 108, and measures a modulation rate between the detected amplitudes of the RF signals of the minimum and maximum marks. In order to measure the modulation rate, the modulation rate measuring unit 111 compares the detected amplitudes of the RF signals of the minimum and maximum marks in units of blocks. The modulation rate measuring unit 111 sends the comparison result to the control unit 103.

The asymmetry measuring unit 112 detects the amplitudes of the RF signals of the minimum mark and the maximum mark of the random data recorded in the predetermined area of the disc 101 in units of blocks using the RF signal sent from the RF amplifier 108, measures the asymmetry between the detected amplitudes of RF signals of the minimum and maximum marks, and supplies a measurement result of the asymmetry to the control unit 103. The measurement of the asymmetry measures whether the detected RF signals are symmetric about a central axis.

The minimum mark and the maximum mark are determined by the control unit 103 depending on the kind of disc.

Figure 2:
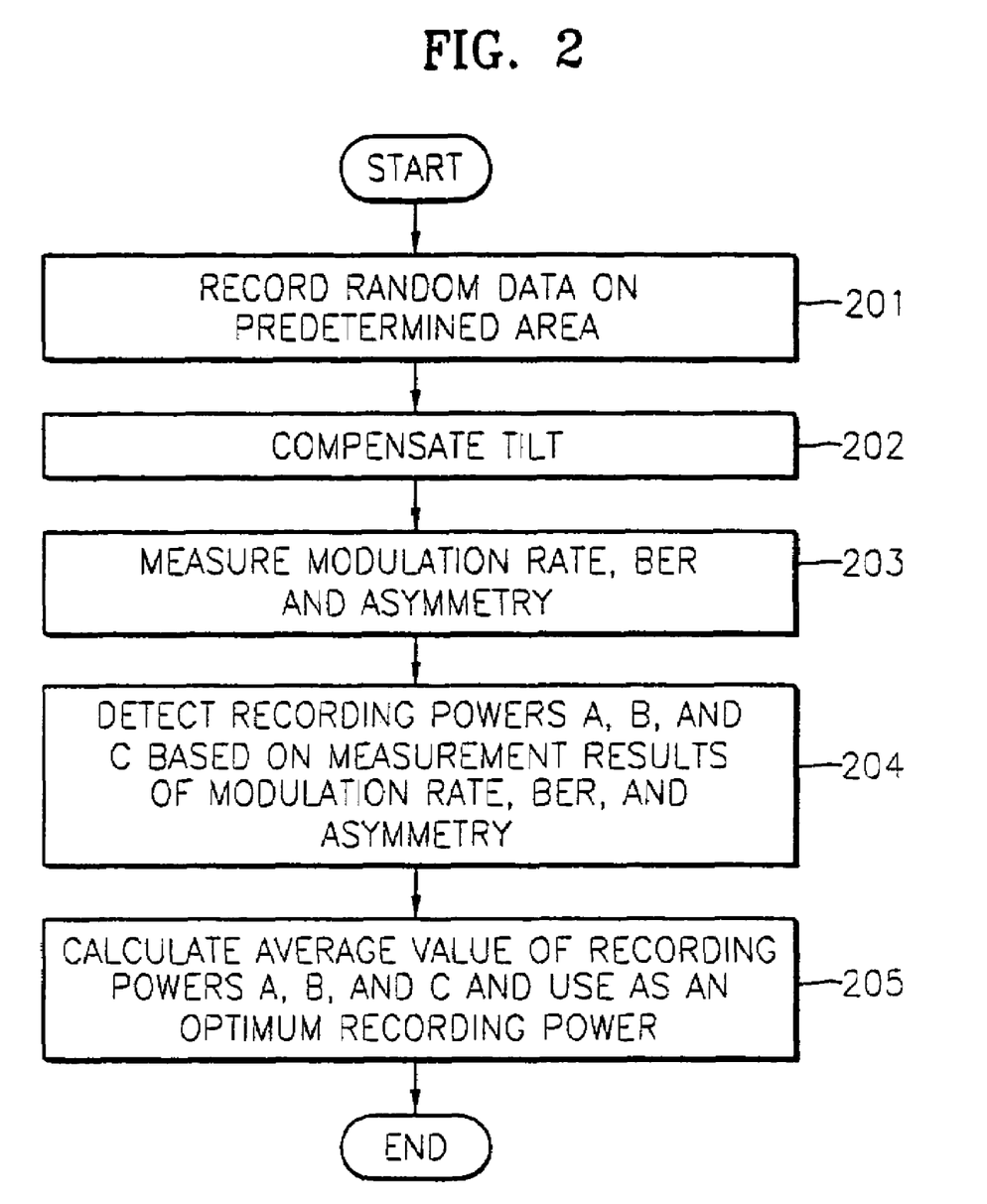
FIG. 2 is a flow chart for explaining a method for determining an optimum recording power in a disc drive according to an aspect of the present invention.

FIG. 2 is a flow chart explaining a method for determining an optimum recording power in a disc drive according to an embodiment of the present invention.

First, the random data is recorded in the predetermined area of the disc 101 in operation 201. Here, an optimum recording power used in recording the random data is decided based on a reference recording power Po' which is preset in the disc drive, a coefficient $\epsilon$ recorded in a recording information supplying area (for example, an ATIP area in a case of CD) of the disc 101, and a predetermined variable range a of the reference recording power Po'. When the random data is recorded, the reference recording power Po' varies within the predetermined variable range α. Positions of the random data recorded on the disc 101 and optimum recording powers used in the positions are managed together by the control unit 103. Thus, the control unit 103 can refer to a corresponding optimum recording power based on the recording position of the random data.

In operation 202, a tilt of the disc 101 is compensated. A method of compensating the tilt is the same as that described earlier in the explanation of FIG. 1.

In operation 203, a modulation rate, a BER, and asymmetry with respect to the random data recorded in the predetermined area are measured in units of blocks using the modulation rate measuring unit 111, the BER measuring unit 110, and the asymmetry measuring unit 112 as shown in FIG. 1.

In operation 204, the control unit 103 detects a first recording power A based on a measurement result of the modulation rate as described in conjunction with FIG. 1. The control unit 103 detects a second recording power B based on a measurement result of the BER as described in conjunction with FIG. 1. The control unit 103 detects a third recording power C based on a measurement result of the asymmetry as described in conjunction with FIG. 1.

In operation 205, an average value of the detected first, second, and third recording powers A, B, and C respectively, is calculated, and the average value is determined as an optimum recording power Po for the disc 101.

Although the random data is recorded in the predetermined area of the disc in the above-described embodiment, the present invention can be applied to determined or fixed data recorded in the predetermined area of the disc.

In the above-described embodiment, the plurality of recording powers are detected based on the measurement results respectively measured by the BER measuring unit 110, the modulation rate measuring unit 111, and the asymmetry measuring unit 112, and then the optimum recording power is decided based on the plurality of recording powers. However, without considering the BER measured by the BER measuring unit 110, the control unit 103 sets a plurality of reference values in consideration of the modulation rate and the asymmetry measured by the modulation rate measuring unit 111 and the asymmetry measuring unit 112, compares the amplitude of the RF signal outputted from the RF amplifier 108 with the plurality of reference values, and detects a plurality of recording powers satisfying the plurality of reference values. Thus, an optimum recording power can be decided based on the plurality of reference values without considering the BER.

As described above, an optimum recording power is first decided using the plurality of reference values which are set in the control unit 103, and then a final optimum recording power for the disc 101 can be decided in further consideration of an optimum recording power, which is detected, based on information such as BER supplied from the decoder 109.

The control unit 103 can detect the plurality of recording powers based on information such as BER supplied from the decoder 109 and can decide an optimum recording power based on the plurality of recording powers.

As described above, a recording power used by an active layer of a disc can be prevented from varying due to hardware error in a disc drive with respect to all kinds of discs by recording data in a predetermined area of the disc while varying a recording power based on a reference recording power which is preset in the disc drive, detecting a plurality of recording powers by comparing predetermined reference values with the amplitude of a RF signal picked up from the disc and/or a signal outputted from a decoder, and determining an optimum recording power using the detected plurality of recording powers.

According to other aspects of the invention, the control unit 103 or other component is a computer implementing the method shown in FIG. 2 using data encoded on a computer readable medium.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An apparatus determining an optimum recording power suitable for a disc loaded in a disc drive, comprising:
a pickup unit recording data on the disc and reproducing the recorded data from the disc; and
a control unit controlling the disc drive to record data in a predetermined area of the disc using a preset reference recording power, detecting a plurality of recording powers using reproduction signals of the predetermined area reproduced from the pickup unit and at least one reference value, and determining the optimum recording power for the disc based on the detected plurality of recording powers,
wherein the control unit determines the recording powers used when the data is recorded in the predetermined area based on the reference recording power, a predetermined variable range of the reference recording power, and a coefficient ($\epsilon$) recorded in a recording information supplying area of the disc.

2. The apparatus of claim 1, wherein when the data is recorded in the predetermined area of the disc, the control unit varies the reference recording power.

3. An apparatus determining an optimum recording power suitable for a disc loaded in a disc drive, comprising:
a pickup unit recording data on the disc and reproducing the recorded data from the disc; and
a control unit controlling the disc drive to record data in a predetermined area of the disc using a preset reference recording power, detecting a plurality of recording powers using reproduction signals of the predetermined area reproduced from the pickup unit and at least one reference value, and determining the optimum recording power for the disc based on the detected plurality of recording powers,
wherein the one or more reference values are set in consideration of one of a modulation rate and asymmetry between the reproduction signals from the pickup unit.

4. An apparatus determining an optimum recording power suitable for a disc loaded in a disc drive, comprising:
a pickup unit recording data on the disc and reproducing the recorded data from the disc; and
a control unit controlling the disc drive to record data in a predetermined area of the disc using a preset reference recording power, detecting a plurality of recording powers using reproduction signals of the predetermined area reproduced from the pickup unit and at least one reference value, and determining the optimum recording power for the disc based on the detected plurality of recording powers,
wherein the one or more reference values is a plurality of values set by considering a modulation rate and an asymmetry between the reproduction signals of the predetermined area reproduced from the pickup unit.

5. An apparatus determining an optimum recording power suitable for a disc loaded in a disc drive, comprising:
a pickup unit recording data on the disc and reproducing the recorded data from the disc; and
a control unit controlling the disc drive to record data in a predetermined area of the disc using a preset reference recording power, detecting a plurality of recording powers using reproduction signals of the predetermined area reproduced from the pickup unit and at least one reference value, and determining the optimum recording power for the disc based on the detected plurality of recording powers,
wherein in a case where the reference value is set in consideration of a modulation rate between the reproduction signals of the predetermined area reproduced from the pickup unit, the control unit detects a reproduction signal having a modulation rate closest to the reference value, and detects a recording power used when the detected reproduction signal is recorded as one of the plurality of recording powers.

6. The apparatus of claim 5, wherein the modulation rate is a modulation rate between amplitudes of reproduction signals of a minimum mark and a maximum mark recorded in the predetermined area among the reproduction signals from the pickup unit.

7. The apparatus of claim 5, wherein the reference value corresponding to the modulation rate is variably set depending on the kind of the disc.

8. An apparatus determining an optimum recording power suitable for a disc loaded in a disc drive, comprising:
  a pickup unit recording data on the disc and reproducing the recorded data from the disc; and
  a control unit controlling the disc drive to record data in a predetermined area of the disc using a preset reference recording power, detecting a plurality of recording powers using reproduction signals of the predetermined area reproduced from the pickup unit and at least one reference value, and determining the optimum recording power for the disc based on the detected plurality of recording powers,
  wherein in a case where the reference value is set in consideration of an asymmetry between the reproduction signals of the predetermined-area reproduced from the pickup unit, the control unit detects a reproduction signal having the asymmetry closest to the reference values, and detects a recording power used when the detected reproduction signal is recorded as one of the plurality of recording powers.

9. The apparatus of claim 8, wherein the asymmetry is used to detect whether the reproduction signals of a minimum mark and a maximum mark recorded in the predetermined area among the reproduction signals from the pickup unit are asymmetric with respect to each other.

10. The apparatus of claim 1, wherein the control unit calculates an average value of the detected plurality of recording powers used as an optimum recording power.

11. The apparatus of claim 1, further comprising a tilt compensation unit which is controlled by the control unit and drives the pickup unit to compensate a tilt with respect to the predetermined area of the disc.

12. The apparatus of claim 11, wherein the control unit detects a compensation amount for the tilt in which an amount of jitter is at a minimum based on the reproduction signal outputted from the pickup unit when the control unit controls the tilt compensation unit while the amount of compensation for the tilt based on an amount of the tilt detected in the pickup unit varies within a predetermined angle range, and determines the detected compensation amount for the tilt as an optimum compensation amount for the tilt.

13. An apparatus determining an optimum recording power suitable for a disc loaded in a disc drive, comprising:
  a pickup unit recording data on the disc and reproducing the recorded data from the disc;
  a control unit controlling the disc drive to record data in a predetermined area of the disc using a preset reference recording power, detecting a plurality of recording powers using reproduction signals of the predetermined area reproduced from the pickup unit and at least one reference value, and determining the optimum recording power for the disc based on the detected plurality of recording power; and
  a decoder decoding a signal outputted from the pickup unit and outputs signals,
  wherein
    the control unit checks if a predetermined signal among the signals outputted from the decoder satisfies the reference value, and detects a recording power used when the predetermined signal is recorded as one of the plurality of recording powers, and
    in a case where the reference value is set in consideration of a block error rate, the control unit detects information of block error rates of the signals outputted from the decoder, detects a block where the block error rate is at a minimum, and detects a recording power used when data is recorded on the detected block as one of the plurality of recording powers.

14. The apparatus of claim 1, wherein random data is recorded in the predetermined area.

15. The apparatus of claim 1, wherein the predetermined area is included in a lead-in area of the disc.

16. The apparatus of claim 1, wherein the predetermined area is an area adjacent to the lead-in area of the disc.

17. A method for determining an optimum recording power suitable for a disc loaded in a disc drive, comprising:
  recording data in a predetermined area of the disc using a preset reference recording power that varies;
  detecting a plurality of reproduction signals among signals reproduced from the predetermined area on the disc based on one or more reference values;
  detecting a plurality of recording powers corresponding to the detected plurality of reproduction signals; and
  determining an optimum recording power for the disc using the detected plurality of recording powers,
  wherein the recording of data comprises recording the data having recording powers determined based on the reference recording power, a predetermined variable range of the reference recording power, and a coefficient recorded in a recording information supplying area of the disc.

18. The method of claim 17, wherein the recording of data comprises recording the data while the reference recording power varies.

19. A method for determining an optimum recording power suitable for a disc loaded in a disc drive, comprising:
  recording data in a predetermined area of the disc using a preset reference recording power that varies;
  detecting a plurality of reproduction signals among signals reproduced from the predetermined area on the disc based on one or more reference values;
  detecting a plurality of recording powers corresponding to the detected plurality of reproduction signals; and
  determining an optimum recording power for the disc using the detected plurality of recording powers,
  wherein one or more reference values are set in consideration of any one of a modulation rate and an asymmetry between the plurality of reproduction signals.

20. A method for determining an optimum recording power suitable for a disc loaded in a disc drive, comprising:
  recording data in a predetermined area of the disc using a preset reference recording power that varies;
  detecting a plurality of reproduction signals among signals reproduced from the predetermined area on the disc based on one or more reference values;
  detecting a plurality of recording powers corresponding to the detected plurality of reproduction signals; and
  determining an optimum recording power for the disc using the detected plurality of recording powers, wherein one or more reference values is a plurality of values determined by considering the modulation rate and the asymmetry between the plurality of reproduction signals.

21. A method for determining an optimum recording power suitable for a disc loaded in a disc drive, comprising:
recording data in a predetermined area of the disc using a preset reference recording power that varies;
detecting a plurality of reproduction signals among signals reproduced from the predetermined area on the disc based on one or more reference values;
detecting a plurality of recording powers corresponding to the detected plurality of reproduction signals; and
determining an optimum recording power for the disc using the detected plurality of recording powers,
wherein in a case where one or more reference values are set in consideration of the modulation rate of the plurality of reproduction signals, the detecting of the plurality of recording powers comprises:
detecting one of the plurality of reproduction signals having a modulation rate closest to the reference values, and
detecting a recording power used when the detected reproduction signal is recorded as one of the plurality of recording powers.

22. A method for determining an optimum recording power suitable for a disc loaded in a disc drive, comprising:
recording data in a predetermined area of the disc using a preset reference recording power that varies;
detecting a plurality of reproduction signals among signals reproduced from the predetermined area on the disc based on one or more reference values;
detecting a plurality of recording powers corresponding to the detected plurality of reproduction signals; and
determining an optimum recording power for the disc using the detected plurality of recording powers,
wherein in a case where one or more reference values are set in consideration of the asymmetry between the plurality of reproduction signals, the detecting of the plurality of recording powers comprises:
detecting one of the plurality of reproduction signals having an asymmetry closest to the reference values, and
detecting a recording power used when the detected reproduction signal is recorded as one of the plurality of recording powers.

23. The method of claim 17, wherein the determining of the optimum recording power comprises determining an average value of the detected plurality of recording powers as the optimum recording power.

24. The method of claim 17, further comprising compensating a tilt with respect to the predetermined area on the disc before detecting the plurality of recording powers.

25. A method for determining an optimum recording power suitable for a disc loaded in a disc drive, comprising:
recording data in a predetermined area of the disc using a preset reference recording power that varies;
detecting a plurality of reproduction signals among signals reproduced from the predetermined area on the disc based on one or more reference values;
detecting a plurality of recording powers corresponding to the detected plurality of reproduction signals; and
determining an optimum recording power for the disc using the detected plurality of recording powers,
wherein in a case where one or more reference values are set in consideration of a block error rate, the detecting of the plurality of recording powers comprises:
detecting information of block error rates of signals decoding the reproducing signals of the predetermined area,
detecting a block having block error rate information satisfying the reference values among the detected information of the block error rates, and
detecting a recording power used when data is recorded on the detected block as one of the plurality of recording powers.

26. The method of claim 17, wherein random data is recorded in the predetermined area.

27. A computer readable medium encoded with processing instructions implementing a method for deciding an optimum recording power suitable for a disc loaded in a disc drive, the method comprising:
recording data in a predetermined area of the disc using a varying preset reference recording power;
detecting a plurality of reproduction signals among signals reproduced from the predetermined area on the disc based on one or more reference values;
detecting a plurality of recording powers corresponding to the detected plurality of reproduction signals; and
deciding an optimum recording power for the disc using the detected plurality of recording powers,
wherein the data has recording cowers decided based on the reference recording power, a predetermined variable range of the reference recording power, and a coefficient recorded in a recording information supplying area of the disc.

28. A computer readable medium encoded with processing instructions implementing a method for deciding an optimum recording power suitable for a disc loaded in a disc drive, the method comprising:
recording data in a predetermined area of the disc using a varying preset reference recording power;
detecting a plurality of reproduction signals among signals reproduced from the predetermined area on the disc based on one or more reference values;
detecting a plurality of recording powers corresponding to the detected plurality of reproduction signals; and
deciding an optimum recording power for the disc using the detected plurality of recording powers,
wherein one or more reference values are set in consideration of a modulation rate closest to a reference value between a plurality of reproduction signals from the pickup unit, a symmetry between the plurality of reproduction signals from the pickup unit, and information on a block error rate.

29. The computer readable medium according to claim 27, further comprising compensating a tilt with respect to the predetermined area on the disc before detecting the plurality of recording powers.

30. A computer readable medium encoded with processing instructions implementing a method for deciding an optimum recording power suitable for a disc loaded in a disc drive, the method comprising:
recording data in a predetermined area of the disc using a varying preset reference recording power;
detecting a plurality of reproduction signals among signals reproduced from the predetermined area on the disc based on one or more reference values;
detecting a plurality of recording powers corresponding to the detected plurality of reproduction signals; and
deciding an optimum recording power for the disc using the detected plurality of recording powers, wherein in a case where one or more reference values are set in consideration of a block error rate, the detection of the plurality of recording powers comprises:

detecting block error rate information of signals decoding the reproducing signals of the predetermined area,     detecting a block having block error rate information satisfying the reference values among the detected block error rate information, and     detecting a recording power used when data is recorded on the detected block as one of the plurality of recording powers.

31. A method of determining an optimum recording power suitable for a disc loaded in a disc drive, comprising:

presetting a reference recording power in the disc drive;

recording a coefficient ($\epsilon$) in a recording information supplying area of the disc;

recording data in a predetermined area of the disc, wherein the reference recording power varies within a predetermined variable range as the data is recorded; and     detecting a recording power corresponding to a position where the data is recorded; and     determining the optimum recording power based on the value of the detected recording powers,     wherein the detecting of recording power is based on at least one of a measurement result of modulation rate of signals from the disc, a measurement result of information of the block error rate of data recorded on the disc, and a measurement result of an asymmetry of signals from the disc.

32. The method according to claim 31, wherein the data recorded is random data.

33. A method of preventing an unwanted varying of a recording power used by an active layer of a disc due to a hardware error in a disc drive, comprising:

recording data in a predetermined area of the disc while varying a recording power based on a reference recording power preset in the disc drive;

detecting a plurality of recording powers by comparing predetermined reference values with an amplitude of at least one of a RF signal picked up from the disc and a signal outputted from a decoder; and     determining an optimum recording power using the detected plurality of recording powers,     wherein the detecting of the plurality of recording powers is based on a measurement result of modulation rate of signals from the disc, a measurement result of information of the block error rate of data recorded on the disc, and a measurement result of an asymmetry of signals from the disc.

* * * * *

UNITED STATES PATENT AND TRADEMARK OFFICE
CERTIFICATE OF CORRECTION

| | |
|---|---|
| PATENT NO. | : 7,227,823 B2 |
| APPLICATION NO. | : 10/657072 |
| DATED | : June 5, 2007 |
| INVENTOR(S) | : Jong-tae An |

It is certified that error appears in the above-identified patent and that said Letters Patent is hereby corrected as shown below:

Column 8, Line 15, change "($\mathbb{C}$)" to --($\varepsilon$)--.

Column 9, Line 27, change "predetermined-area" to --predetermined area--.

Column 9, Line 67, change "power;" to --powers;--.

Column 12, Line 25, change "cowers" to --powers--.

Column 13, Line 16, change "($\mathbb{C}$)" to --($\varepsilon$)--.

Column 13, Line 25, change "powers," to --power,--.

Signed and Sealed this

Thirteenth Day of November, 2007

JON W. DUDAS
*Director of the United States Patent and Trademark Office*